Patented Oct. 8, 1935

2,016,707

UNITED STATES PATENT OFFICE 2,016,707

CASEIN GLUE

Theodore Williams Dike, Seattle, Wash., assignor to I. F. Laucks, Inc., Seattle, Wash., a corporation of Washington No Drawing. Application November 25, 1932, Serial No. 644,271

7 Claims. (Cl. 134—23.9)

This invention relates to improvements in water resistant casein glues, and especially to methods whereby such glues are materially cheapened and both their adhesive power and water resistance improved through admixture of the casein with large quantities of clays and other cheap materials.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

It has been well known that casein glues can be cheapened to a certain extent by dilution with finely divided substances of a supposedly inert character such as clays, wood flour or the like, but in the case of all such procedures it has hitherto been considered that these substances were diluents tending to reduce the adhesive power directly in proportion to the amount used.

I now find that as regards the clays this is not the case and actually instead of reducing adhesive power, admixture with clays has the opposite effect. That is, I find that the adhesive power and water resistance is materially increased with the use of increasing quantities of the clays and that this holds true up to a clay addition of about 60% as compared to the weight of the casein. (All percentages hereafter will be on the weight of casein=100.) Furthermore, I find that as the clay content is increased the lime content may also be increased, so that with 60% clay an addition of over 43% lime is also beneficial with a still further cheapening of the glue. Thus for each 100 parts of casein it is now possible to use more than 60 parts of clay and more than 40 parts of lime and thereby produce a glue of superior dry strength and water resistance as compared to the best casein glues hitherto in use, and it is only as this large admixture of approximately an amount of combined clay and lime equal to the full weight of the casein is exceeded, that impairment of properties by dilution becomes apparent. A further discovery is that colloidal and non-colloidal clays both have useful effects but act differently, particularly valuable results being produced by using both kinds together in suitable proportions.

The non-colloidal clays of which china clay may be taken as a typical example have an ultimate particle size large enough so that they settle out from a water suspension in a few minutes. These clays may be used advantageously as the full clay content of casein clay glues under conditions where maximum dry strength and wood failure is desired in conjunction with good but not the highest degree of water resistance.

The colloidal bentonites are examples of highly colloidal clays. These have ultimate particles of very small size mostly below the colloidal limit and when thoroughly suspended in water, will stay in suspension indefinitely, forming colloidal systems exhibiting typical sol or jel characteristics according to their concentration and state of dispersion. I find that these colloidal clays may also be used as the full clay content in casein-clay glues and give a product characterized by exceedingly high water resistance, but more moderate and irregular dry strength and wood failure.

A further discovery is that if the two kinds of clay are used together so that at least 25% of each kind is present and preferably in about equal quantity, then the good points of both when used alone are imparted to the glue, while the deficiencies of neither are present in the resulting bonds. Although I prefer to use such clays as china clay for the non-colloidal element and colloidal bentonite for the colloidal element and blend them together so as to produce a product of controlled character, certain plastic clays exist which are natural blends of particles of colloidal and non-colloidal properties and these plastic clays may be used satisfactorily so far as they exhibit the proper characteristics.

In practice I find that satisfactory clay glues are obtained only if certain dispersing agents are used to disperse the casein and in sufficient quantity. Alkali metal hydroxides, such as caustic soda, or potash, are satisfactory, either used as such or produced by certain particular forms of double decomposition reaction between lime and some alkali metal salts of weak acids, especially sodium fluoride and soda ash. A preferred combination of this character is sodium fluoride and hydrated lime. I find that other similar alkali metal salts, such as phosphates, borates, etc. do not give fully equivalent results, but one-half of the sodium fluoride may be replaced with soda ash without detriment. If all soda ash is used or if phosphates, borax and the like are used only poor results are obtained. As previously mentioned, caustic soda or potash may be used to replace the double decomposition salts with good results.

I find that there must be an alkalinity of about the usual amount for ordinary casein glues on a caustic soda basis, the desirable limits being six to twelve percent. for caustic soda as such, and ten to twenty percent. of theoretically developed caustic soda if sodium fluoride and lime is used, for example. In either case the amount of clay that can be used advantageously is roughly proportional to the alkalinity, the higher clay content requiring the greater alkalinity.

In regard to the lime, I prefer to use fifteen percent. and upwards over and above the amount which may be required to react with a soda salt, if the double decomposition method of dispersing the casein is employed. This portion of the lime I call "excess lime". I find that as the clay content is increased the excess lime may also be increased so that in glue containing 60% of clay as compared to the weight of the casein, about 25% of excess lime may be advantageously used in addition to the lime required to react with the alkali metal salt. As with this high clay content a sodium fluoride content of 18.75% is desirable, requiring over 17% of lime to react with it, a total lime content of about 44% is obtained, giving a combined lime and clay content of 105% as compared with the weight of the casein. As both lime and clay are very cheap this gives a remarkably inexpensive glue. With this combination both dry strength and water resistance are at a maximum and in spite of the low casein content, materially exceed the values obtained with straight casein glues which, because of their higher casein content, are materially more expensive as well.

I find also that these clay glues are slightly improved both in strength and water resistance by the addition of a small amount of zinc oxide, between one-half and three percent., as compared to the weight of the casein. Other zinc compounds may be employed if of such a nature as to produce a zincate in an alkaline medium, but I prefer to use zinc oxide as it is both cheap and convenient. A further effect is that the presence of the zinc oxide considerably increases the water requirement of the glue which is advantageous as it increases its bulk and spreadability.

The addition also of small amounts of aldehydes which react upon casein in amounts of from 0.25 to 0.75% of the weight of the casein is a useful method of increasing the viscosity and water requirement of these glues. Examples of such aldehydes are formaldehyde, benzaldehyde, acetaldehyde, etc.

The following three formulas illustrate the invention, the ingredients being given by weight:—

| Ingredients | Formula #1 | Formula #2 | Formula #3 |
|---|---|---|---|
| Casein | 100.00 | 100.00 | 100.00 |
| Sodium fluoride | 18.75 | 16.88 | 15.00 |
| Zinc oxide | 1.25 | 1.13 | 1.00 |
| China clay | 30.62 | 21.32 | 12.00 |
| Colloidal bentonite | 30.63 | 21.32 | 12.00 |
| Hydrated lime | 43.75 | 39.35 | 35.00 |
| Total dry ingredients | 225.00 | 200.00 | 175.00 |
| Water | 450.00 | 450.00 | 450.00 |
| Total wet glue | 675.00 | 650.00 | 625.00 |

The dry ingredients are thoroughly mixed and then added to the water in an efficient glue mixer and in about fifteen minutes produce a glue of the usual viscosity for mechanical spreading. When spread at the rate of thirty-five to forty pounds of dry ingredients per thousand square feet of three-ply panels and pressed without heat in the usual way, exceptionally good results are obtained with Douglas fir, yellow birch, red gum and similar woods. While all three formulae give good results as regards dry strength, wood failure and water resistance extensive experience has indicated that the results obtained with Formula #1 are the best, those obtained from Formula #3 the lowest and those obtained from Formula #2 intermediate. It is to be particularly noted that this result is contrary to previous experience for it improves with increasing content of clay and lime, but falls off with increasing content of casein with a decrease in the clay and lime.

Another method of mixing is as follows: The casein and sodium fluoride may be mixed dry and added to water and stirred, then add the clay suspended in water and stir well, then add the hydrated lime in a small amount of water and stir, the zinc oxide and aldehydes may then be added if desired and the glue is ready for use.

I have secured consistent and repeated results of standard shear tests with fir plywood showing strengths after forty-eight hours soaking of test pieces of over 250 lbs. per square inch; and using birch plywood over 500 lbs. per inch dry tensile strength and over 300 lbs. after forty-eight hours soaking of test pieces. Such results were absolutely unknown heretofore with casein glues of any description and particularly casein glues containing less than 50% of casein based on total weight of dry materials used.

While no complete explanation of this unusual condition is apparent, the suggestion is made that this may be due to adsorption effects which are known to be favored by relatively high alkalinity in protein dispersions.

It is understood that the invention is not restricted to the foregoing examples but that many modifications which do not depart from the nature of the invention as defined in the following claims will be apparent to anyone skilled in the art.

Other modes of applying the principle of the invention may be employed instead of the one explained, change being made as regards the features herein disclosed, provided the features stated in any of the following claims, or the equivalent of such be employed.

What I claim is:

1. An adhesive comprising the reaction products of casein, clay, hydrated lime and alkali metal hydroxide in which the percentage of original clay based on the original casein is between the approximate percentages of twenty-four percent. and sixty-two percent.

2. An adhesive comprising the reaction products of casein, clay, hydrated lime and alkali metal hydroxide in which the percentage of original clay based on the original casein is between the approximate percentages of twenty-four percent. and sixty-two percent. and the percentage of the original lime based on the original casein is between the approximate percentages of thirty-three percent. and fifty percent.

3. An adhesive comprising the reaction products of casein, colloidal clay, hydrated lime and alkali metal hydroxide in which the original content of colloidal clay is between approximately ten percent. and approximately thirty percent. of the original casein content.

4. An adhesive comprising the reaction products of casein, colloidal clay, hydrated lime and alkali metal hydroxide in which the original content of colloidal clay is between approximately ten percent. and approximately thirty percent. of the original casein content, and the original amount of alkali metal hydroxide added as such is approximately six percent. to twelve percent. of the original casein content.

5. An adhesive comprising the reaction products of casein, colloidal clay, hydrated lime and an agent reactive therewith by double decomposition to develop alkali metal hydroxide in which the original content of colloidal clay is between approximately ten percent. and approximately thirty percent. of the original casein content and the amount of alkali metal hydroxide theoretically developed by double decomposition is between ten percent. and twenty percent. of the original casein content.

6. An adhesive comprising the reaction products of a colloidal clay with casein, and an alkaline medium in which the percentage of original clay based on the original casein is between the approximate percentages of 24 per cent and 62 per cent, whereby the adhesive properties of a conventional casein glue are increased.

7. An adhesive comprising the reaction products of a colloidal clay and a non-colloidal clay with casein, and an alkaline medium in which the percentage of original clay based on the original casein is between the approximate percentages of 24 per cent and 62 per cent, whereby the adhesive properties of a conventional casein glue are increased.

THEODORE WILLIAMS DIKE.